United States Patent
Lou et al.

(10) Patent No.: US 9,513,001 B2
(45) Date of Patent: Dec. 6, 2016

(54) OXY-FIRED BOILER UNIT AND METHOD OF OPERATING THE SAME

(71) Applicant: ALSTOM Technology Ltd, Baden (CH)

(72) Inventors: Xinsheng Lou, West Hartford, CT (US); Jundong Zhang, Bloomfield, CT (US); Abhinaya Joshi, Glastonbury, CT (US); James A. McCombe, East Longmeadow, MA (US); Armand A. Levasseur, Windsor Lock, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 561 days.

(21) Appl. No.: 14/030,442

(22) Filed: Sep. 18, 2013

(65) Prior Publication Data

US 2015/0079526 A1    Mar. 19, 2015

(51) Int. Cl.
*F23N 1/02*        (2006.01)
*F23K 3/16*        (2006.01)
(Continued)

(52) U.S. Cl.
CPC ............ *F23L 7/007* (2013.01); *F23C 6/04* (2013.01); *F23C 6/045* (2013.01); *F23C 7/008* (2013.01);
(Continued)

(58) Field of Classification Search
CPC ........... F23L 7/007; F23L 15/00; F23C 7/008; F23C 6/04; F23C 6/045; F23C 9/003; F23N 3/00; F23N 5/006
(Continued)

(56) References Cited

U.S. PATENT DOCUMENTS

| 6,505,567 B1 | 1/2003 | Anderson et al. |
| 7,954,458 B2 | 6/2011 | Bozzuto et al. |

(Continued)

FOREIGN PATENT DOCUMENTS

| WO | 2008141412 A1 | 11/2008 |
| WO | 2011020945 A1 | 2/2011 |
| WO | 2012068293 A2 | 5/2012 |

OTHER PUBLICATIONS

Notification of Transmittal of the International Search Report and the Written Opinion of the International Searching Authority, or the Declaration (Forms PCT/ISA/210 and PCT/ISA237) issued on Dec. 12, 2014, by the International Bureau of WIPO, in corresponding International Application No. PCT/EP2014/069738. (14 pages).

*Primary Examiner* — William G Corboy
(74) *Attorney, Agent, or Firm* — Buchanan Ingersoll & Rooney PC

(57) ABSTRACT

An oxy-combustion boiler unit is disclosed which includes a furnace for combusting fuel and for emitting flue gas resulting from combustion. The furnace has first, second and third combustion zones, and an air separation unit for separating oxygen gas from air and providing a first portion of the separated oxygen to a first oxidant flow, a second portion to a second oxidant flow, and a third portion of the separated oxygen gas to the first, second, and third zones of the furnace. A controller can cause the separated oxygen gas to be distributed so that the first and second oxygen flows have a desired oxygen content, and so that the first, second, and third zones of the furnace receive a desired amount of oxygen based on a combustion zone stoichiometry control.

19 Claims, 2 Drawing Sheets

(51) Int. Cl.
  *F23B 10/00* (2011.01)
  *F23L 15/00* (2006.01)
  *F23L 7/00* (2006.01)
  *F23C 7/00* (2006.01)
  *F23C 6/04* (2006.01)
  *F23N 3/00* (2006.01)
  *F23N 5/00* (2006.01)
  *F23C 9/00* (2006.01)
(52) U.S. Cl.
  CPC ............... *F23C 9/003* (2013.01); *F23L 15/00* (2013.01); *F23N 3/00* (2013.01); *F23N 5/006* (2013.01); *F23C 2201/101* (2013.01); *F23C 2202/30* (2013.01); *F23C 2900/06041* (2013.01); *F23L 2900/07001* (2013.01); *F23L 2900/07005* (2013.01); *F23L 2900/07006* (2013.01); *F23L 2900/07007* (2013.01); *F23N 2021/08* (2013.01); *F23N 2037/26* (2013.01); *Y02E 20/322* (2013.01); *Y02E 20/344* (2013.01)

(58) Field of Classification Search
  USPC ............. 431/12, 13; 110/118, 209, 296, 302
  See application file for complete search history.

(56) References Cited

U.S. PATENT DOCUMENTS

| | | | |
|---|---|---|---|
| 2008/0160464 A1* | 7/2008 | Ghani | F23C 3/008 431/9 |
| 2009/0133611 A1 | 5/2009 | Morin et al. | |
| 2010/0236500 A1* | 9/2010 | Douglas | F23C 7/002 122/22 |
| 2012/0052450 A1 | 3/2012 | Lou et al. | |
| 2012/0145052 A1* | 6/2012 | Levasseur | F23C 5/12 110/341 |

* cited by examiner

OXY-FIRED BOILER UNIT AND METHOD OF OPERATING THE SAME

STATEMENT REGARDING FEDERALLY SPONSORED RESEARCH

The United States Government has rights in this invention pursuant to a grant having contract number DE-NT0005290 from the U.S. Department of Energy/National Energy Technology Laboratory (NETL).

FIELD

The present disclosure relates to an oxy-fired boiler unit, energy production system that utilizes at least one such boiler unit, and methods of operating the same.

BACKGROUND

Boiler units for energy production systems have been utilized for coal burning power plants and the like. Such boiler units utilize air and send air to a furnace to combust coal to create steam that is subsequently used for generating electricity. Boiler units utilized in electricity production and other components of such systems are described, for example, in U.S. Patent Application Publication Nos. 2012/0052450, 2012/0145052, 2010/0236500, and 2009/0133611 and U.S. Pat. Nos. 7,954,458 and 6,505,567.

Oxy-combustion is a development for carbon dioxide capture and sequestration in fossil fuel (e.g. coal, etc.) fired power plants to replace combustion air with a mixture of oxygen and recycled flue gas to create a high carbon dioxide content flue gas stream that can be more easily processed for usage (e.g. enhanced oil recovery) and/or sequestration. In U.S. Patent Application Publication No. 2012/0145052, it is disclosed that some oxy-combustion systems may include an air separation unit, a boiler, a pollution control system, and a gas processing unit for recycling flue gas. The heat from combustion and the residual heat in the flue gas of the boiler may be used produce superheated steam to drive a steam turbine generator to produce electricity. The flue gas may then be processed to remove certain pollutants (e.g. $NO_x$, $SO_x$, etc.) and a portion of the treated flue gas may then be recycled to the boiler to effect combustion. As disclosed in U.S. Patent Application Publication No. 2012/0134042, oxygen is added to the recycled flue gas based on how much fuel is to be combusted in the boiler. The oxygen is added to the flue gas to form a single oxidant flow and that single oxidant flow is then fed to the boiler. Such systems are susceptible to inefficiency and to system degradation.

SUMMARY

An oxy-combustion boiler unit may include a furnace for combusting fuel and for emitting flue gas resulting from combustion. The furnace may have a first combustion zone, a second combustion zone and a third combustion zone. An air separation unit for receiving air and for separating oxygen gas from the air may also provided in the boiler unit. The boiler unit may also include at least one conduit for mixing a first portion of the separated oxygen gas with a first flow of the flue gas to form a first oxidant flow having a first predetermined content of oxygen therein, for mixing a second portion of the separated oxygen gas with a second flow of the flue gas to form a second oxidant flow having a second predetermined content of oxygen therein, and for directing a third portion of the separated oxygen gas to the first, second and third combustion zones of the furnace for combustion of the fuel, wherein the conduit directs the first oxidant flow to the first combustion zone of the furnace and directs the second oxidant flow to the first, second and third combustion zones of the furnace. The boiler unit may also include a controller for combustion zone stoichiometry control of the furnace by causing a first amount of the third portion of the separated oxygen gas to be sent to the first combustion zone, a second amount of the third portion of the separated oxygen gas to be sent to the second combustion zone, and a third amount of the third portion of the separated oxygen gas to be sent to the third combustion zone. The first amount, the second amount, and the third amount may be determined based on a difference between: a total amount of oxygen specified for combustion of the fuel in the first, second, and third combustion zones, and an amount of oxygen determined to be within the first and second oxidant flows.

A method of operating an oxy-combustion boiler unit can include at least the steps of: feeding fuel to a furnace for combusting the fuel, the furnace having a first combustion zone, a second combustion zone and a third combustion zone, separating via an air separation unit oxygen gas from air, mixing a first portion of the separated oxygen gas with a first flow of flue gas emitted by the furnace to form a first oxidant flow, mixing a second portion of the separated oxygen gas with a second flow of flue gas emitted by the furnace to form a second oxidant flow, directing the first oxidant flow to the first combustion zone of the furnace, directing the second oxidant flow to the first, second and third zones of the furnace, distributing a third portion of the separated oxygen gas to the first, second, and third combustion zones based on a specified combustion zone stoichiometry such that a first amount of the third portion of the separated oxygen gas is sent to the first zone, a second amount of the third portion of the separated oxygen gas is sent to the second zone, and a third amount of the third portion of the separated oxygen gas is sent to the third zone, and determining the first, second, and third amounts of the third portion of the separated oxygen gas based on a difference between: a total amount of oxygen specified for combustion of the fuel in the first, second, and third combustion zones, and an amount of oxygen determined to be present within the first and second oxidant flows.

A controller for controlling operation of an oxy-combustion boiler unit is also provided. The controller may include a program stored in non-transitory memory which, upon execution by a processor of the controller, will cause the controller to: establish a rate at which fuel is fed to a furnace for combustion in each of a first combustion zone, a second combustion zone and a third combustion zone, mix a first portion of separated oxygen gas with a first flow of flue gas emitted by the furnace to form a first oxidant flow that is directed to the first combustion zone of the furnace, mix a second portion of the separated oxygen gas with a second flow of flue gas emitted by the furnace to form a second oxidant flow that is directed to the first, second, and third combustion zones of the furnace, distribute a third portion of the separated oxygen gas to the first, second, and third combustion zones based on a specified combustion zone stoichiometry such that a first amount of the third portion of the separated oxygen gas will be sent to the first zone, a second amount of the third portion of the separated oxygen gas will be sent to the second zone, and a third amount of the third portion of the separated oxygen gas is sent to the third zone, and determine the first, second, and third amounts of the third portion of the separated oxygen gas based on a difference between: a total amount of oxygen specified for combustion of the fuel in the first, second, and third combustion zones, and an amount of oxygen determined to be present within the first and second oxidant flows. It should be understood that in some embodiments, the controller may be configured to cause mixing of different portions of the separated oxygen gas and distribution of a third portion of the separated oxygen gas via communications with valves and other elements of a conduit through which fluid is fed to a boiler unit, communications with a storage tank of an air separation unit that may store oxygen separated by an air separation unit that is within the conduit or is in communication with the conduit, and communications with the air separation unit.

BRIEF DESCRIPTION OF THE DRAWINGS

Exemplary embodiments of boiler units and associated exemplary methods are shown in the accompanying drawings. It should be understood that like reference numbers used in the drawings may identify like components, wherein.

Other details, objects, and advantages of embodiments of the innovations disclosed herein will become apparent from the following description of exemplary embodiments and associated exemplary methods.

DETAILED DESCRIPTION

Applicants have discovered that mixing oxygen to form a single oxidant flow, and subsequently feeding that single oxidant flow to a boiler, can impact system efficiency and degradation. For example, use of a single stream of oxidant to feed oxygen to a boiler can result in inefficient use of oxygen and unstable combustion of fuel. Further, using a single oxidant flow can result in damage to components or require more costly materials, such as conduits for passing the oxidant flow to a boiler or a heater, as the concentration of oxygen within an oxidant flow may be desired at high concentrations that can contribute to corrosion of metals in such components. Exemplary boiler designs and methods of operating a boiler for oxy-combustion based systems, as disclosed herein, can address the foregoing issues.

Figure 1:
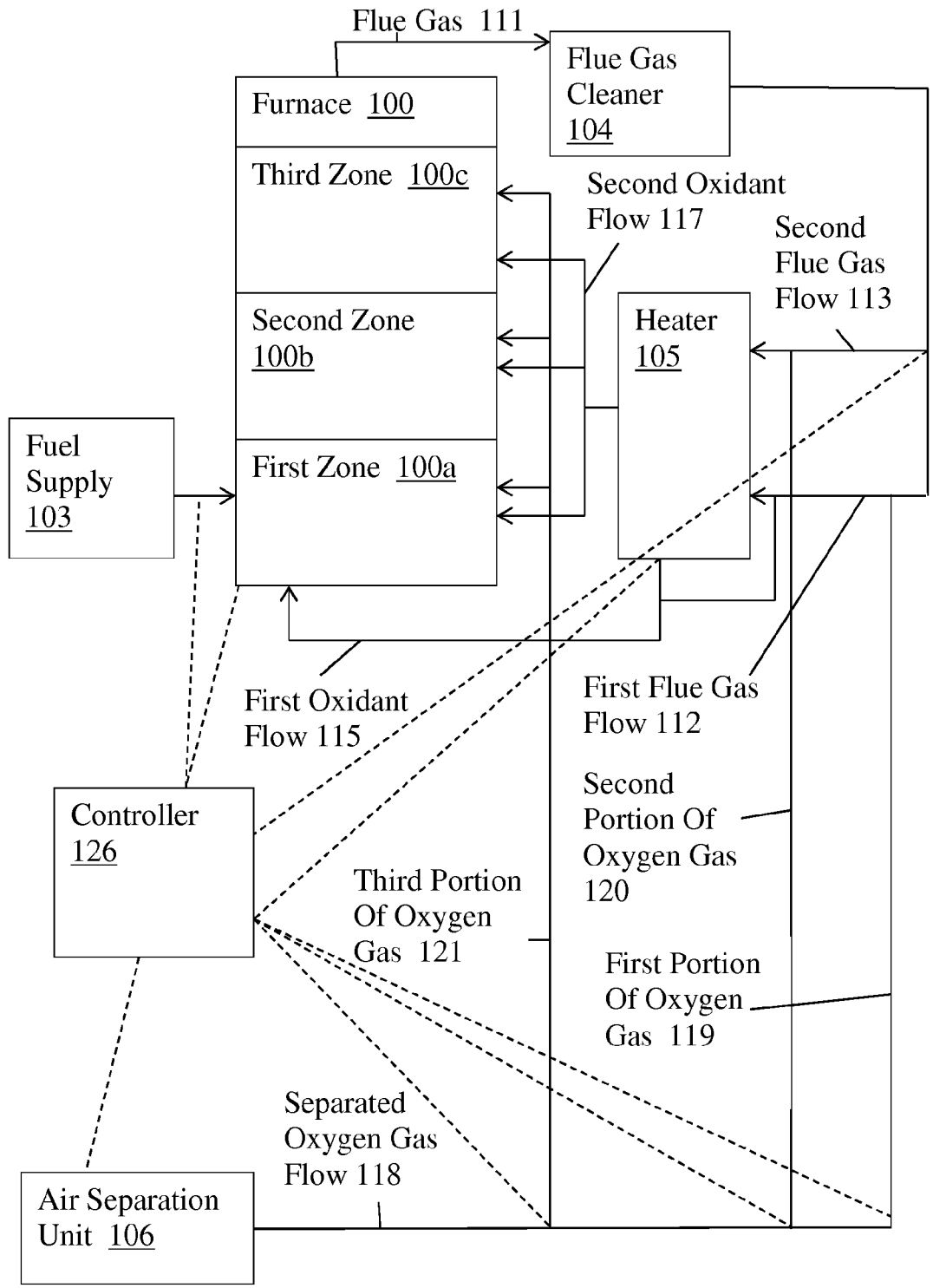
FIG. 1 is a block diagram of an exemplary embodiment of an oxy-combustion boiler unit for oxy-combustion of a fuel.
Figure 2:
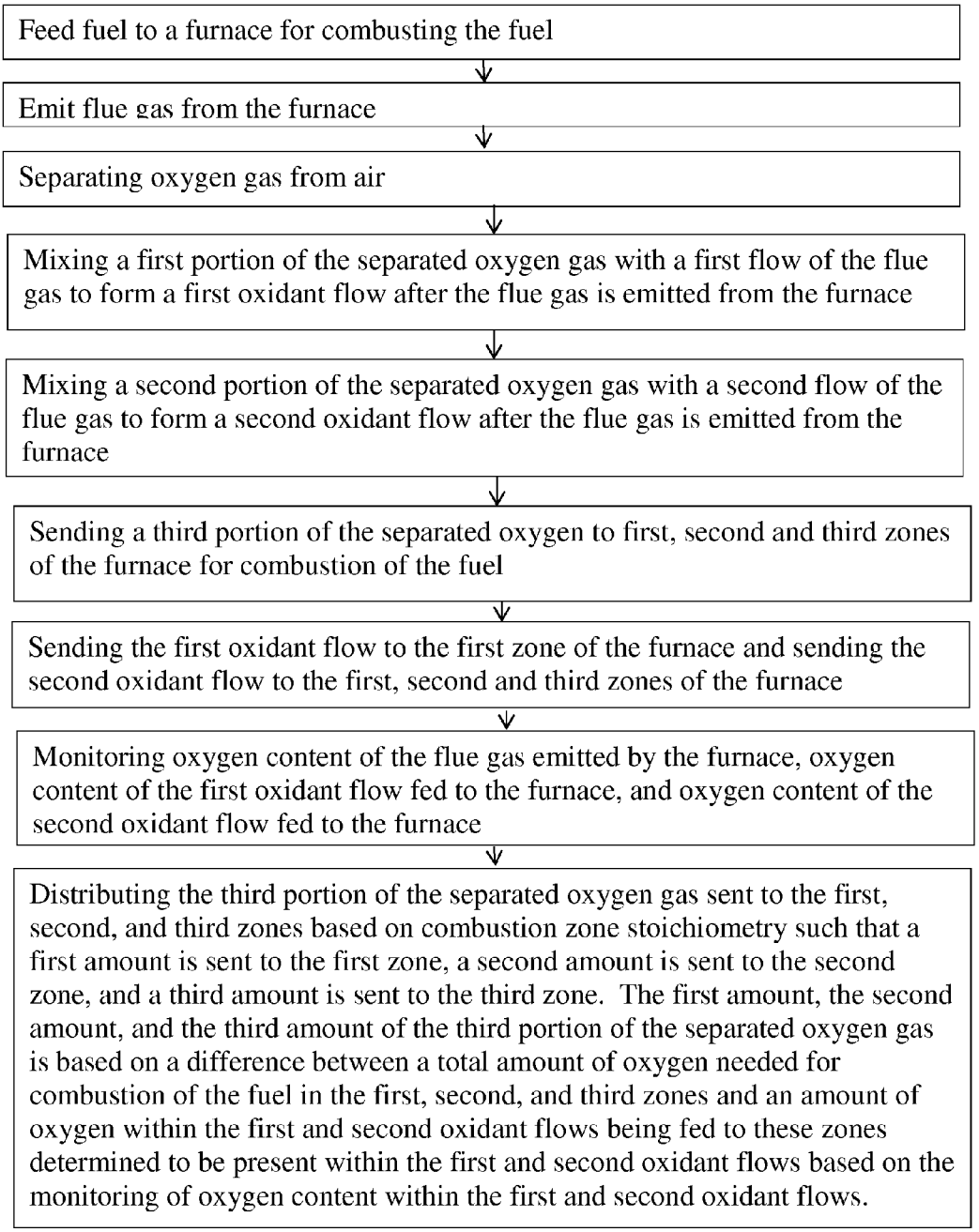
FIG. 2 is a flow chart illustrating an exemplary method of operating a boiler unit.

FIG. 1 shows an exemplary oxy-combustion boiler unit as part of an electricity production system that can include one or more boiler units. One boiler unit of such a system may include a furnace 100 that has multiple combustion zones within a combustion chamber of the furnace, such as a first zone 100a, a second zone 100b and a third zone 100c. Each of the zones 100a, 100b, and 100c may be configured to combust a certain fraction of fuel supplied to the furnace from a fuel supply 103. An example of such fuel may be coal or another type of fossil fuel. In embodiments that utilize coal, the coal may be pulverized prior to being fed to the furnace 100.

The second zone 100b is positioned between the first and third zones 100a, 100c. The first zone 100a may be positioned to receive the fuel being fed to the furnace and the third zone 100c may be located closest to an outlet of the furnace. There may be only one burner within the first zone 100a of the furnace, or there may be multiple spaced apart burners in the first zone 100a of the furnace that are spaced apart for combusting the fuel within the first, second, and third zones of the furnace. In some embodiments, there may be as many as four burners, eight burners, or more or less burners, that are spaced apart around an inner periphery of the combustion chamber of the furnace. In addition to being spaced apart from each other, some of the burners may be located at positions that are higher than the positions of other burners to help facilitate a desired heating profile within the combustion chamber.

Portions of a conduit may be communicatively connected to the furnace to supply different flows to the furnace to facilitate combustion of the fuel. Such portions of a conduit may include a plurality of valves or other control elements of the conduit that are adjustably controlled to vary an amount of different flows that may be fed to different zones of the furnace. Portions of the conduit through which different flows of the boiler unit pass upon being emitted from the furnace for subsequent treatment and use, including portions for flow mixing and feeding back to the furnace, may be appreciated from the arrows illustrated in FIG. 1.

Flue gas 111 that includes products from the combustion (e.g. gaseous $CO_2$, $CO$, $H_2O$, etc.) of the fuel may be emitted from the outlet of the furnace. The flue gas 111 that is emitted from the furnace may have its heat used to generate electricity via a turbine (not shown). The flue gas may subsequently be sent to a flue gas cleaner 104, such as a scrubber element or other device that is utilized to absorb, adsorb, or otherwise remove pollutants or other undesirable components from the flue gas 111 such as $NO_x$ and $SO_x$ components of the flue gas 111.

A portion of a conduit may extend from the furnace to the flue gas cleaner 104 to transport the flue gas 111 for treatment. The flue gas 111 may then be split or separated into at least two flows such as a first flue gas flow 112 and a second flue gas flow 113. The subsequent splitting of the flue gas 111 that occurs after it is treated by the flue gas cleaner 104 may occur via conduits, vessels, valves, or other portion of the conduit that is located upstream and/or downstream from the flue gas cleaner 104 that is positioned between the flue gas cleaner 104 and a heater 105 and is in communication with the flue gas cleaner 104 for transporting the flue gas and splitting the flue gas into different flows. Valves or other control elements of the conduit may be positioned within this portion of the conduit to facilitate an adjustable control of how much of the flue gas should be split into different flows.

Fans or pumps may be in communication with the conduit to drive movement of the flue gas at a desired flow rate. The flow rates of the first and second flue gas flows and may be determined by a controller 126 that is communicatively connected to the conduit to control flow rates of the flue gas flows.

The controller 126 may determine the flow rates of the first and second flue gas flows 112 and 113 from a control function curve that is based on unit load demand to identify a total demand for flue gas. The first flue gas flow 112 may then be determined based on the rate at which fuel is being fed to the furnace and the second flue gas flow 113 may be based on subtracting the first flue gas flow from the total flue gas flow demand. The controller 126 may establish the rate at which fuel is being added or an amount of fuel is being fed to the furnace by communicating with a fuel flow rate detector or other measuring unit or a device that controls or monitors the feeding of fuel to the furnace. The controller 126 may also establish the rate at which fuel is fed to the furnace by determining an amount of fuel being fed to the furnace based on data the controller 126 receives from a measuring device or a device that controls or monitors the feeding of fuel to the furnace.

Oxygen content of the flue gas 111 emitted from the furnace may be monitored by one or more measuring devices or other type of measuring unit. For example, the measuring devices may be oxygen detectors or other flow detectors or sensors that collect data usable to determine a content of oxygen within the flow of flue gas. Each measuring device may be positioned within the conduit through which the flue gas 111 emitted by the furnace passes, and other measuring devices may be positioned in the conduit downstream of the flue gas cleaner to monitor oxygen content of the first and second flue gas flows 112 and 113.

Oxygen gas that is separated from air may subsequently be fed to the first and second flue gas flows 112, 113 to form first and second oxidant flows 115, 117 that each comprise the flue gas and separated oxygen gas mixed with the flue gas. The oxygen gas that is fed to the first and second flue gas flows 112, 113 to mix with the flue gas flows to form the first and second oxidant flows 115, 117 may be fed at a rate that is determined to control an oxygen content level in the first and second oxidant flows 115, 117. For example, the first and second oxidant flows 115, 117 may each be formed so that oxygen content of the oxidant flow stays between 15% and 23% by volume oxygen of the material within the oxidant flows.

In an exemplary embodiment, oxygen may be fed to the first and second flue gas flows so that the desired set point of oxygen content within the first and second oxidant flows is 21% by volume of material within the first and second oxidant flows 115, 117. Maintaining the oxygen content of the oxidant flows at about 21% by volume (e.g. maintaining oxygen content at 21% by volume+/−1-3%) can help reduce corrosion and other maintenance problems that can arise from oxygen being at levels that are substantially higher than the concentration of oxygen in air.

The oxygen content of the flue gas 111 emitted by the furnace and oxygen content of the first and second flue gas flows 112, 113 may be monitored to determine how much oxygen is needed to be fed to each of the first and second flue gas flows 112, 113 to mix with these flows to form the first and second oxidant flows 115, 117. The oxygen that is subsequently added to the first and second flue gas flows 112 and 113 to form the first and second oxidant flows 115, 117 may be an amount sufficient to bring the total oxygen content by volume for each of the formed first and second oxidant flows 115, 117 to within a desired oxygen content range such as, for example, 15%-23% by volume oxygen.

Sensors, detectors or other measuring devices readily available may be connected to portions of the conduit through which such flows pass to measure flow rates, oxygen content within the flows, or other variables that either directly measure oxygen content or permit a measurement of oxygen content within these flows to be determined. The measuring devices may be connected to the conduit through which such flows pass such as vessels, pipes, ducts, vales, or other conduit elements.

In exemplary embodiments, such measuring devices are communicatively connected to a controller 126 and may communicate measurement data to the controller 126. The controller 126 may process that data to determine oxygen contents within the different flows to monitor the oxygen content within those flows and cause adjustments to different operational parameters of the boiler unit to adjust the flows to meet different operational criteria such as desired oxygen contents within the flue gas flows, oxidant flows, or other flows.

In other embodiments, the measuring data may identify such oxygen content to the controller 126 and the controller 126 may subsequently cause adjustments to the boiler unit to adjust different operations of the boiler unit as needed to adjust oxygen contents within the different flows to meet a desired set point for oxygen content within those flows. The controller 126 may also utilize such oxygen content information to determine the amount of total oxygen being fed to the different zones of the furnace and how much more oxygen may be needed to be fed to the zones of the furnace to ensure a specified amount of combustion of the fuel occurs within the furnace. In an exemplary embodiment, the specified amount of combustion is a complete combustion of the fuel so that sufficient oxygen is determined to be needed to be fed to the furnace to ensure a complete combustion of the fuel.

The oxygen gas that is fed to the first and second flue gas flows 112, 113 may be extracted from air or separated from air by an air separation unit 106. The air separation unit 106 may be a device that is configured to extract or separate oxygen from air so that oxygen is separated from nitrogen and other elements of air. A portion of a conduit may extend from the air separation unit 106 to define a path of travel for the separated oxygen gas flow 118 to different elements of the boiler unit such as the furnace 100 or other parts of the conduit for mixing with other flues (e.g. flue gas flows etc.). A pump or fan may be in communication with the conduit to control a flow rate of such separated oxygen gas as well.

The separated oxygen gas flow 118 that is produced by the air separation unit 106 may subsequently be fed to the first and second flue gas flows 112, 113. For example, a first portion of the oxygen gas 119 so separated may be fed to the first flue gas flow 112 to mix with the first flue gas flow 112 to form the first oxidant flow 115 so that the first oxidant flow 115 has a first predetermined oxygen content that is within a desired oxygen content range. A second portion of the oxygen gas 120 that is separated via the air separation unit 106 may be fed to the second flue gas flow 113 to mix with the second flue gas flow 113 and form the second oxidant flow 117 so that the second oxidant flow 117 has a second predetermined oxygen content that is within a desired oxygen content range. Those skilled in the art will appreciate that the portion of the conduit that may extend from the air separation unit to the first and second flue gas flows 112, 113 to facilitate transportation of the separated oxygen gas and mixing of the oxygen gas with the first and second flue gas flows 112, 113 may include pipes or other ducts, valves and vessels that permit the flows to pass from the air separation unit 106 to the first and second flue gas flows 112 and 113 for transportation and mixing of the flows. The valves may be adjusted via the controller 126 or other control element to adjustably control distribution of the oxygen gas being mixed with the first and second flue gas flows.

The first and second oxidant flows 115, 117 may be formed prior to the first and second oxidant flows being fed to a heater 105. The heater 105 may heat at least a portion of each of the first and second oxidant flows 115, 117. In exemplary embodiments, the heater 105 may heat the entirety of each of the first and second oxidant flows 115, 117. In other embodiments, the heater may only heat a portion of each flow and another portion of each flow may bypass the heater 105. For example, a certain portion of the first oxidant flow 115 may bypass the heater and subsequently be remixed with a portion of the first oxidant flow that passes through the heater so that the first oxidant flow has a desired temperature prior to being fed to the furnace 100. The proportion of the first oxidant flow 115 that may bypass the heater 105 can change during operations and depend on the amount of fuel to be fed to the furnace, a desired operational temperature of the furnace, and the temperature of the first oxidant flow 115 that is desired for feeding into the furnace as well as other design considerations. Portions of the conduit that includes pipes, ducts, vessels and valves that are all connected together and in communication with each other may define the path of travel through which the first and second oxidant flows 115 and 117 pass through the heater 105 and through which a portion of the first oxidant flow 115 may bypass the heater 105.

Thereafter, the first oxidant flow 115 may be fed to only the first zone 100a of the furnace 100 and the second oxidant flow 117 may be fed to the first zone 100a, second zone 100b, and third zone 100c of the furnace in varying amounts to provide a desired amount of oxygen to each zone for a desired amount of stable combustion of the fuel in each zone. The conduit through which the first and second oxidant flows 115 and 117 pass may include pipes, ducts, vessels, and valves that are interconnected together and in communication with each other to transport the first and second oxidant flows 115 and 117 to the zones of the furnace 100. The controller 126 may communicate with valves or other elements of the conduit to control adjustment of valves or the other elements for controlling the distribution of the second oxidant flow 117 to the different zones of the furnace.

A third portion of oxygen gas 121 may be supplied from the air separator unit 106 and be fed to the first zone 100a, second zone 100b and/or third zone 100c to supplement oxygen provided via the first and second oxidant flows 115, 117 to ensure that there is sufficient oxygen fed to the furnace to efficiently combust all the fuel fed to the furnace in a stable way. For example, a first amount of the third portion of separated oxygen gas may be sent to the first zone 100a, a second amount of the third portion of the oxygen gas may be sent to the second zone 100b, and a third amount of the third portion of the oxygen gas may be sent to the third zone 100c. The first, second, and third amounts of the third portion of oxygen gas 121 may be the total amount of oxygen gas within the third portion of oxygen gas 121 that is distributed from the separated oxygen gas flow 118 generated by the air separation unit 106. The third portion of oxygen gas 121 may be transported from the air separation unit 106 via a portion of the conduit, which may be comprised of one or more ducts or pipes through which the oxygen gas may flow, vessels in communication with such pipes or ducts, and valves that connected to such elements and that may be actuated to adjust a distribution of the third portion of oxygen gas fed to the first, second, and third zones 100a, 100b, and 100c of the furnace 100.

The controller 126 may be communicatively coupled to the air separation unit 106, conduits through which different flows of flue gas, separated oxygen gas, and oxidant flows pass and sensors, detectors or other measuring devices that may monitor the flow rates and oxygen content of the flue gas flow 111 emitted from the furnace, first and second flue gas flows 112, 113, and first and second oxidant flows 115, 117, and pumps or fans that are in communication with the conduit to help control flow rates of the flows. The controller 126 may be configured to determine how the third portion of oxygen gas 121 should be distributed to the first, second and third zones 100a, 100b, and 100c of the furnace to provide a complete combustion of fuel while maintaining a stable flame or stable burn of fuel in the furnace.

The controller 126 may be a computer device that has at least one specifically programmed processor formed with hardware and/or software components, the processer being communicatively connected to non-transitory memory having at least one program stored thereon that defines a stoichiometric control for the control of oxygen being fed to the furnace 100. The processor, for example, can be an Intel® Processor i3-4158U, or any other processor.

The controller 126 may also include at least one transceiver unit for communicatively connecting to different sensors, detectors, valves that control conduits through which different flows pass, and other elements of the boiler unit to control how oxygen is fed to the furnace. The transceiver may be connected to the processor of the controller 126 to permit a wired communication connection, a wireless communication connection or a combination of wireless and wired communication connections to such elements of the boiler unit.

Different communication connections that may be formed between the controller 126 and such elements of the boiler unit are illustrated in FIG. 1 in broken lines. For example, the controller 126 may be connected to measuring devices connected to a conduit through which oxidant, flue gas, or separated oxygen gas flows, the furnace, the conduit through which fuel is fed to the furnace (e.g. valves through which flow rates of different flows are controlled), or other elements of the boiler unit. In some embodiments, the controller may be a programmable logic controller, a distributed control system ("DCS"), a workstation, a server, or other computer device, for example.

The controller 126 may be configured so that the first, second and third amounts of oxygen from the third portion of oxygen gas 121 of the oxygen gas separated by the air separation unit 106 is distributed based on a stoichiometric combustion control process to meet the demands for oxygen for each combustion zone within the furnace (e.g. first zone 100a, second zone 100b, third zone 100c). In an exemplary embodiment, the controller 126 may be configured to determine an amount of the fuel being fed to the furnace 100 to meet a particular demand level for electricity production and also determine a first amount of oxygen to combust a first fraction of the amount of fuel within the first zone 100a. Such a determination can be based on a control function curve that takes into account the rate at which fuel is being fed to the furnace and correlates that rate along with operating parameters of the furnace to identify a necessary amount of oxygen to be fed to the furnace to completely combust the fuel or at least the first fraction of fuel within the first zone 100a. The first fraction may be a relatively large component of the total amount of fuel fed to the furnace, such as over 50% of the fuel, 70% or more of the fuel, 82% or more of the fuel, or more than 85% of the fuel. The controller may also determine an amount of oxygen within the first oxidant flow 115 that is being fed to the first zone 100a and the amount of oxygen of the second oxidant flow 117 being fed to the first zone. The amount of oxygen within the first and second oxidant flows 115, 117 being fed to the first zone 100a is then subtracted from the first amount of oxygen needed to combust the first fraction of fuel fed to the furnace to identify a first demand for oxygen via the first amount of the third portion of oxygen gas 121 to be distributed to the first zone to fully combust the first fraction of fuel within the first zone in a stable manner. The first amount of the third portion of the oxygen gas 121 may then be the amount of oxygen needed to meet this determined first demand of oxygen for the first zone 100a.

The controller 126 may also determine a second amount of oxygen to combust a second fraction of the amount of fuel within the second zone 100b. Such a determination can also be made based on a control function curve as well as the measured total oxygen flow being sent to the second zone of the furnace. The second fraction may be smaller than the first fraction. For instance, the second fraction of the fuel may be less than 50% of the fuel, 25% of the fuel, 18% of the fuel, 10% of the fuel, or less than 10% of the fuel. The controller 126 may also determine an amount of oxygen being fed to the second zone 100*b* via the second oxidant flow 117 and subtract that amount of oxygen from the determined second amount of oxygen needed to combust the second fraction of fuel in the second zone 100*b* to determine a second demand of oxygen for the second zone for stably combusting the second fraction of fuel within the second zone 100*b*. The second amount of the third portion of the oxygen gas 121 may then be the amount of oxygen needed to meet this determined second demand of oxygen for the second zone 100*b*.

A third amount of oxygen to combust a third fraction of the amount of fuel within the third zone 100*c* may also be determined by the controller 126. Such a determination may be based on a control function curve based on operational parameters of the furnace, fuel rate of fuel fed to the furnace, and oxygen being fed to the third zone via the second oxidant flow 117. The third fraction may be smaller than the second fraction and also smaller than the first fraction. The third fraction may be, for instance, less than 25%, 20%, 15%, 10%, 5% or less than 5% of the fuel fed to the furnace. An amount of oxygen being fed to the third zone 100*c* via the second oxidant flow 117 is also determined and is then subtracted from the third amount of oxygen needed to combust the third fraction of fuel to determine a third demand of oxygen for the third zone for stably combusting the third fraction of fuel within the third zone. The third amount of the third portion of the oxygen gas 121 may then be the amount of oxygen needed to meet this determined third demand of oxygen for the third zone 100*c*.

It should be appreciated that the total amount of oxygen within the third portion of oxygen gas of the oxygen gas separated from air via the air separation unit 106 is the sum of the first, second and third amounts of oxygen determined or specified, to meet the first, second, and third demands of the first, second and third zones 100*a*, 100*b*, and 100*c*. The first and second portions of the separated oxygen gas can be specified based on the amount of oxygen to be fed to the first and second flue gas flows 112, 113 to ensure the first and second oxidant flows 115, 117 have sufficient oxygen content to be within a desired oxygen content range (e.g. a predetermined oxygen content of about 21% by volume or between 18-23% by volume). Based on these known amounts of oxygen, a total amount of oxygen output from the air separation unit 106 can be specified so that that the controller can communicate with the air separation unit to control its separation and output of oxygen gas to meet the demand of oxygen of the furnace.

In some embodiments, the controller 126 may be configured to only meet the demand of oxygen for the first and second oxidant flows based on having the first and second portions of the oxygen gas 119, 120 to be an amount of oxygen desired to keep the first and second oxidant flows 115 and 117 at their desired predetermined oxygen content fractions. The amount of oxygen within the third portion of oxygen gas 121 that is separated by the air separation unit may then only be determined based on the combustion zone stoichiometry control processed by the controller.

To ensure that the combustion of the fuel in each zone occurs in a stable manner so that the flame within the furnace does not get too hot at certain areas or too cold in other areas within the furnace, a predetermined amount of excess oxygen may be delivered to the furnace and may be factored into the determination of the demands for oxygen needed by each combustion zone of the furnace. For instance, a predetermined excess content of 1-10% of oxygen may be desired to ensure that there is sufficient oxygen within the furnace to ensure a stable combustion of the fuel within each zone of the furnace. This additional 1-10% need for oxygen may be incorporated in the above noted calculations to ensure this extra amount of oxygen is fed to the furnace and each zone of the furnace as needed. Control for this excess amount may be based on monitoring of the flue gas 111 emitted by the furnace to ensure that the oxygen content of the emitted flue gas stays within a 1-10% by volume of oxygen content range or is maintained at a set point of 2% or 3% or 5% oxygen content by volume of material within the flue gas to ensure that sufficient excess oxygen is present within the furnace for stable combustion of the fuel. To maintain such excess levels of oxygen, total amount of oxygen for all zones of combustion of the furnace that is needed for combusting the total amount of fuel may be multiplied by 1.01, 1.02, 1.03, or 1.05 to determine the demand for oxygen within the third portion of oxygen gas 121 to be distributed for combustion.

It should be understood that embodiments of a boiler unit may have other elements in addition to those discussed above or variations to such embodiments. For instance, valves may be controlled by the controller to adjust flow rates of flue gas, oxygen, or oxidant to a desired flow rate to meet combustion demands of the furnace. Valves may also be actuated by the controller 126 to be fully opened, fully closed or adjustably partially opened or closed to control flow rates and oxygen content being fed to the furnace for combusting the fuel. There may be any number of different conduit portions that are configured to define different types of paths along which the flue gas, oxidant flows, and oxygen may pass that includes any number of different valves and vessels through which the flows must pass. There may also be any number of pumps or fans in communication to such conduits to which a controller may communicate to adjust a flow rate for such flows. It should also be appreciated that a predetermined oxygen content of any of the flows discussed herein may differ from the number or ranges expressly identified herein as examples. For instance, it is contemplated that the oxidant flows may be maintained at different oxygen contents or be controlled to within different predetermined oxygen contents such as an oxygen content of below 18%.

It should also be understood that the oxygen gas separated from air via the air separation unit 106 may also include other elements such as nitrogen or other components of air in relatively small quantities as air separation units may not be able to perfectly separate only oxygen from the air. For instance, oxygen gas may make up 85-99% of the content by volume of the separated oxygen gas flow 118 or portions of this flow that is distributed to the flue gas flows or furnace zones.

It should be appreciated that any of the above noted features of a boiler unit in any particular embodiment expressly discussed herein may be combined with other features or elements of other embodiments except when such a combination would be mutually exclusive or otherwise incompatible therewith as may be appreciated by those of at least ordinary skill in the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An oxy-combustion boiler unit, comprising:
a furnace for combusting fuel and for emitting flue gas resulting from combustion, the furnace having a first combustion zone, a second combustion zone and a third combustion zone, the second combustion zone being between the first combustion zone and the third combustion zone;
an air separation unit for receiving air and for separating oxygen gas from the air;
at least one conduit for mixing a first portion of the separated oxygen gas with a first flow of the flue gas to form a first oxidant flow having a first predetermined content of oxygen of between 15% and 23% by volume oxygen therein, for mixing a second portion of the separated oxygen gas with a second flow of the flue gas to form a second oxidant flow having a second predetermined content of oxygen of between 15% and 23% by volume oxygen therein, and for directing a third portion of the separated oxygen gas to the first, second and third combustion zones of the furnace for combustion of the fuel, wherein the at least one conduit directs the first oxidant flow to the first combustion zone of the furnace, directs the second oxidant flow to the first, second and third combustion zones of the furnace, and directs the third portion of the separated oxygen gas to be sent to the first, second, and third combustion zones; and
a controller for combustion zone stoichiometry control of the furnace by causing a first amount of the third portion of the separated oxygen gas to be sent to the first combustion zone, a second amount of the third portion of the separated oxygen gas to be sent to the second combustion zone, and a third amount of the third portion of the separated oxygen gas to be sent to the third combustion zone;
the controller configured such that the first amount of the third portion of the separated oxygen gas is determined based on the controller determining a fuel feed rate at which fuel is fed to the furnace for combustion and correlating that fuel feed rate with operating parameters of the furnace to identify a necessary amount of oxygen to be fed to the furnace to combust a first fraction of the fuel within the first combustion zone such that a difference between the necessary amount of oxygen to be fed to the furnace to combust the first fraction of the fuel and a total amount of oxygen supplied to the first combustion zone via the first oxidant flow and the second oxidant flow is the first amount of the third portion of the separated oxygen gas to be directed to the first combustion zone via the at least one conduit;
the controller configured such that the second amount of the third portion of the separated oxygen gas is determined based on the controller identifying a necessary amount of oxygen to be fed to the furnace to combust a second fraction of the fuel within the second combustion zone that is smaller than the first fraction of the fuel such that a difference between the necessary amount of oxygen to be fed to the second combustion zone to combust the second fraction of the fuel and a total amount of oxygen supplied to the second combustion zone via the second oxidant flow is the second amount of the third portion of the separated oxygen gas to be directed to the second combustion zone via the at least one conduit; and
the controller configured such that the third amount of the third portion of the separated oxygen gas is determined based on the controller identifying a necessary amount of oxygen to be fed to the furnace to combust a third fraction of the fuel within the third combustion zone that is smaller than the second fraction of the fuel such that a difference between the necessary amount of oxygen to be fed to the third combustion zone to combust the third fraction of the fuel and a total amount of oxygen supplied to the third combustion zone via the second oxidant flow is the third amount of the third portion of the separated oxygen gas to be directed to the third combustion zone via the at least one conduit.

2. The boiler unit of claim 1, wherein the first fraction of fuel is more than 50% of fuel fed to the furnace, the second fraction of fuel is less than 25% of the fuel fed to the furnace, and the third fraction of fuel is less than 25% of the fuel fed to the furnace.

3. The boiler unit of claim 2, wherein the first predetermined content of oxygen is between 18% and 21% by volume of material within the first oxidant flow, and the second predetermined content of oxygen is between 18% and 21% by volume of material within the second oxidant flow.

4. The boiler unit of claim 3, wherein the controller is also configured to control the first and second portions of the separated oxygen gas to ensure the first oxidant flow has the first predetermined content of oxygen and the second oxidant flow has the second predetermined content of oxygen; and
the controller is configured to determine the first, second, and third amounts of the third portion of the separated oxygen gas such that flue gas emitted by the furnace will have a third specified oxygen content that is between 1% and 10% by volume of material within the flue gas.

5. The boiler unit of claim 4, wherein the third specified oxygen content is 2%, 3% or 5% by volume of material within the flue gas.

6. The boiler unit of claim 1, comprising:
a heater for heating a first portion of the first oxidant flow and a first portion of the second oxidant flow prior to those flows being fed to the furnace.

7. The boiler unit of claim 6, comprising:
a conduit for causing a second portion of the first oxidant flow to bypass the heater, and to merge with the first portion of the first oxidant flow downstream of the heater.

8. The boiler unit of claim 1, wherein the furnace comprises:
a plurality of spaced apart burners located within the first combustion zone of the furnace, each of the burners receiving a respective portion of the first oxidant flow sent to the first combustion zone.

9. The boiler unit of claim 1, wherein the controller is configured to:
control an amount of air separated by the air separation unit so that an amount of the oxygen gas separated by the air separation unit is equal to or greater than an amount determined by subtracting a total amount of oxygen to combust the fuel from a total amount of oxygen within the first and second flows of flue gas.

10. The boiler unit of claim 1, wherein the furnace is a coal-fired furnace and the fuel is comprised of coal.

11. The boiler unit of claim 1, comprising:
means for processing flue gas emitted by the furnace to remove $NO_x$ components and to subsequently separate the flue gas into the first flow of flue gas and the second flow of flue gas;
at least one measuring device for supplying data to the controller for determining oxygen content of the first and second oxidant flows, each measuring device being connected to the at least one conduit; and
wherein the at least one conduit includes plural ducts that extend from the air separation unit to the furnace, and plural valves connected to the ducts, the controller being communicatively connected to the valves for controlling distribution of the first portion, second portion and third portion of the oxygen gas separated by the air separation unit to the first oxidant flow, the second oxidant flow and the furnace.

12. A method of operating an oxy-combustion boiler unit comprising:
feeding fuel to a furnace for combusting the fuel, the furnace having a first combustion zone, a second combustion zone and a third combustion zone;
separating via an air separation unit oxygen gas from air;
mixing a first portion of the separated oxygen gas with a first flow of flue gas emitted by the furnace to form a first oxidant flow having a first predetermined content of oxygen of between 15% and 23% by volume oxygen therein;
mixing a second portion of the separated oxygen gas with a second flow of flue gas emitted by the furnace to form a second oxidant flow having a second predetermined content of oxygen of between 15% and 23% by volume oxygen therein;
directing the first oxidant flow to the first combustion zone of the furnace;
directing the second oxidant flow to the first, second and third combustion zones of the furnace;
distributing a third portion of the separated oxygen gas to the first, second, and third combustion zones based on a specified combustion zone stoichiometry such that a first amount of the third portion of the separated oxygen gas is sent to the first combustion zone, a second amount of the third portion of the separated oxygen gas is sent to the second combustion zone, and a third amount of the third portion of the separated oxygen gas is sent to the third combustion zone;
determining the first amount of the third portion of the separated oxygen gas based on determining a fuel feed rate at which fuel is fed to the furnace for combustion and correlating that fuel feed rate with operating parameters of the furnace to identify a necessary amount of oxygen to be fed to the furnace to combust a first fraction of the fuel within the first combustion zone such that a difference between the necessary amount of oxygen to be fed to the furnace to combust the first fraction of the fuel and a total amount of oxygen supplied to the first combustion zone via the first oxidant flow and the second oxidant flow is the first amount of the third portion of the separated oxygen gas to be distributed to the first combustion zone;
determining the second amount of the third portion of the separated oxygen gas based on identifying a necessary amount of oxygen to be fed to the furnace to combust a second fraction of the fuel within the second combustion zone that is smaller than the first fraction of the fuel such that a difference between the necessary amount of oxygen to be fed to the second combustion zone to combust the second fraction of the fuel and a total amount of oxygen supplied to the second combustion zone via the second oxidant flow is the second amount of the third portion of the separated oxygen gas to be distributed to the second combustion zone; and
determining the third amount of the third portion of the separated oxygen gas based on identifying a necessary amount of oxygen to be fed to the furnace to combust a third fraction of the fuel within the third combustion zone that is smaller than the second fraction of the fuel such that a difference between the necessary amount of oxygen to be fed to the third combustion zone to combust the third fraction of the fuel and a total amount of oxygen supplied to the third combustion zone via the second oxidant flow is the third amount of the third portion of the separated oxygen gas to be distributed to the third combustion zone.

13. The method of claim 12, wherein a control function curve is utilized to determine the first amount, second amount, and third amount of the third portion of the separated oxygen gas.

14. The method of claim 13,
wherein the determining of the first amount, second amount, and third amount of the third portion of the separated oxygen gas is also performed to control flue gas concentration of flue gas output from the furnace such that flue gas output by the furnace will have a third specified oxygen content.

15. The method of claim 14, wherein the first predetermined content of oxygen is between 18% and 21% by volume of material of the first oxidant flow and the second predetermined content of oxygen is between 18% and 21% by volume of material of the second oxidant flow.

16. The method of claim 15, wherein the third specified oxygen content is between 1% and 10% by volume of material within the flue gas.

17. The method of claim 14, comprising:
heating first portions of the first and second oxidant flows prior to those first portions being fed to the furnace.

18. The method of claim 17, comprising:
bypassing the heater with a second portion of the first oxidant flow; and
merging the first and second portions of the first oxidant flow into a unitary flow after the first portion of the first oxidant flow is heated.

19. The method of claim 12, comprising:
controlling an amount of air separated by the air separation unit so that an amount of the oxygen gas separated by the air separation unit is equal to or greater than an amount determined by subtracting a total amount of oxygen to combust the fuel from a total amount of oxygen within the first and second flows of flue gas; and
monitoring oxygen content of flue gas emitted by the furnace, oxygen content of the first oxidant flow, and oxygen content of the second oxidant flow.

* * * * *